United States Patent
Dannenhauer et al.

[11] Patent Number: 6,106,001
[45] Date of Patent: Aug. 22, 2000

[54] GAS BAG MODULE

[75] Inventors: Reiner Dannenhauer, Welzheim; Jens Debler, Herlikofen; Joachim Lutz, Schechingen, all of Germany

[73] Assignee: TRW Occupant Restraint Systems GmbH & Co. KG, Alfdorf, Germany

[21] Appl. No.: 09/283,768

[22] Filed: Apr. 1, 1999

[30] Foreign Application Priority Data

Apr. 7, 1998 [DE] Germany .................. 298 06 402 U

[51] Int. Cl.[7] ............................ B60R 21/16; B60R 21/28
[52] U.S. Cl. ................................... 280/728.2; 280/741
[58] Field of Search ......................... 280/728.1, 728.2, 280/741, 731, 732

[56] References Cited

U.S. PATENT DOCUMENTS

| | | | |
|---|---|---|---|
| 5,364,123 | 11/1994 | Abramczyk et al. | 280/728.2 |
| 5,474,323 | 12/1995 | Davidson | 280/728.2 |
| 5,498,024 | 3/1996 | Caruso, Jr. et al. | 280/728.2 |
| 5,613,704 | 3/1997 | White, Jr. et al. | 280/732 |
| 5,709,402 | 1/1998 | Leonard | 280/728.2 |
| 5,788,266 | 8/1998 | Rose et al. | 280/732 |
| 5,788,269 | 8/1998 | Jakovski et al. | 280/728.2 |
| 5,876,058 | 3/1999 | Nemoto | 280/732 |
| 5,899,485 | 5/1999 | Fosom et al. | 280/728.2 |
| 5,941,556 | 8/1999 | Rose | 280/728.2 |

Primary Examiner—J. J. Swann
Assistant Examiner—F. Zeender
Attorney, Agent, or Firm—Tarolli, Sundheim, Covell, Tummino & Szabo L.L.P.

[57] ABSTRACT

A gas bag module for a vehicle occupant restraint system has a generally trough-shaped housing, a folded gas bag and an insert for insertion into the housing. The housing has a face wall with an opening. The gas bag module further comprises a tubular inflator. The tubular inflator is inserted into the housing through the opening in the face wall of the housing. The housing has an inner side with supporting faces for the insert. The insert has integral rim portions surrounded by an inflation opening in the gas bag. The insert is provided with an integral guide plate extending substantially parallel to inner surface areas of the housing and slightly spaced away therefrom. The insert comprises, opposite the opening in the face wall of the housing, a corresponding opening for passage of the inflator. The inflator protrudes outwardly from the opening in the face wall of the housing. The insert is clamped at the rim portions against the supporting faces of the housing.

6 Claims, 2 Drawing Sheets

GAS BAG MODULE

FIELD OF THE INVENTION

The invention relates to a gas bag module for a vehicle occupant restraint system.

BACKGROUND OF THE INVENTION

Among the many known types of gas bag modules it is the type having a generally trough-shaped housing and an insert part inserted therein, via which the gas bag is connected to the housing, that has the advantage of few individual components and simplified assembly. This module can be furnished as a complete unit and then installed in the vehicle.

Securing the inflator to the housing of such a gas bag module is, however, considerably complicated due to the high loads involved in it being activated.

SUMMARY OF THE INVENTION

By the invention a gas bag module is further simplified, especially as regards securing the inflator to the housing.

According to the invention a gas bag module for a vehicle occupant restraint system is provided which comprises a generally trough-shaped housing, a folded gas bag and an insert for insertion into the housing. The housing has a face wall with an opening. A tubular inflator is inserted into the housing through the opening in the face wall of the housing. The housing has an inner side with supporting faces for the insert. The insert comprises integral rim portions surrounded by an inflation opening of the gas bag. The insert is provided with an integral guide plate extending substantially parallel to inner surface areas of the housing and slightly spaced away therefrom. The insert comprises, opposite the opening in the face wall of the housing, a corresponding opening for passage of the inflator. The inflator protrudes outwardly from the opening in the face wall of the housing. The insert is clamped at its rim portions against the supporting faces of the housing.

Preferably the inflator is clamped in place between a rim defining the opening in the face wall of the housing and a rim defining the corresponding opening of the insert.

The inflator is thus secured to the housing without any separate fastener elements. Clamping the tubular inflator between the rims of the openings in the housing and in the insert acts initially radial, but due to friction also axial. A screw fixture, more particularly a screw engaging the end face of the inflator and securing it axially relative to the housing may, nevertheless, be provided for axially locking the inflator in place.

In the preferred embodiment the inflator projects from the housing at each of its axial ends. Furthermore, the gas bag is provided with a mounted fastener tab which surrounds the guide plate of the insert so that on expansion of the gas bag the inflator serves as a tie rod locking the insert and, via same, the gas bag to the housing.

In a particularly advantageous embodiment the folded gas bag takes up the space of the housing which is defined between its supporting faces and the surrounding rim of the housing facing away from the supporting faces.

Since due to the tubular inflator acting as a tie rod the loads occurring on activation of the inflator are favorably transferred to the housing, it is possible to fabricate this housing of a fiber-reinforced plastics material.

BRIEF DESCRIPTION OF THE DRAWINGS

Further advantages and features of the invention read from the following description of a preferred embodiment with reference to the drawing in which.

DESCRIPTION OF PREFERRED EMBODIMENTS

Figure 1:
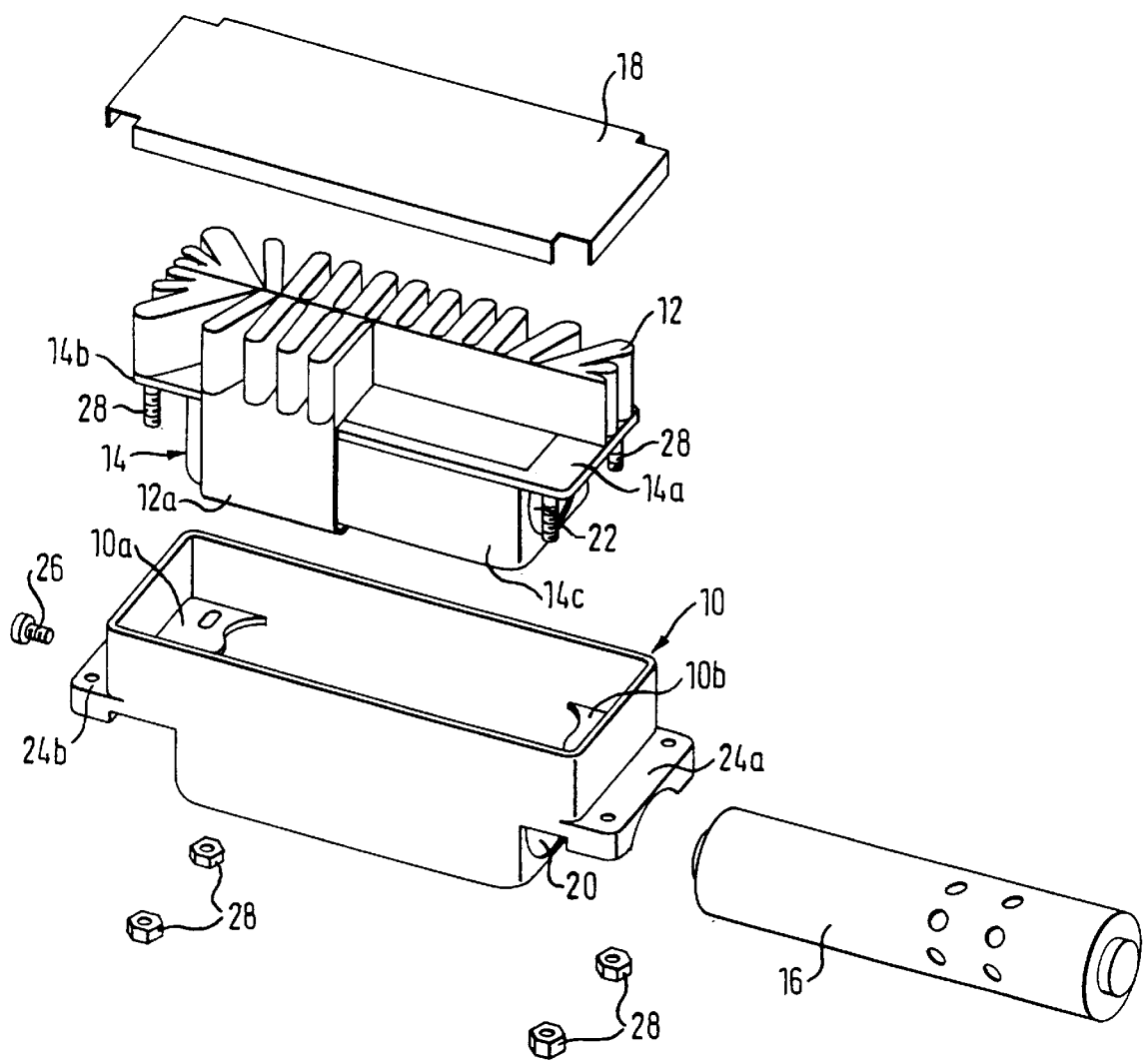
FIG. 1 is a partly sectioned exploded view of the gas bag module.
Figure 2:
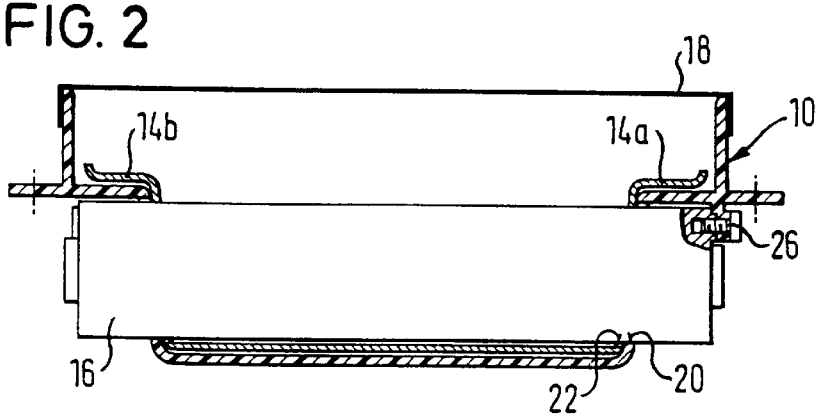
FIG. 2 is a schematic longitudinal section through the housing of the gas bag module.
Figure 3:
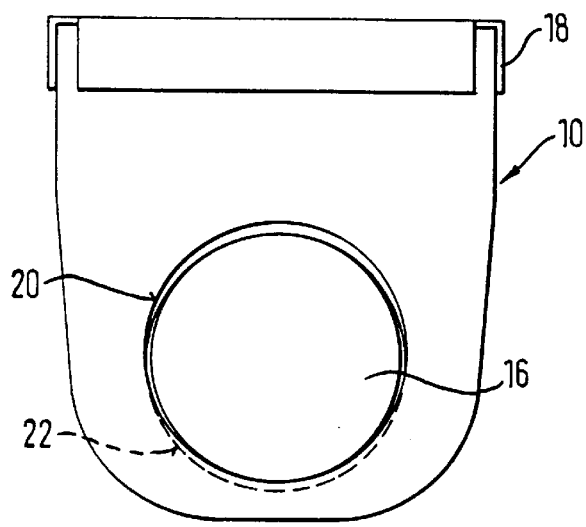
FIG. 3 is a schematic face view of the gas bag module.
Figure 4:
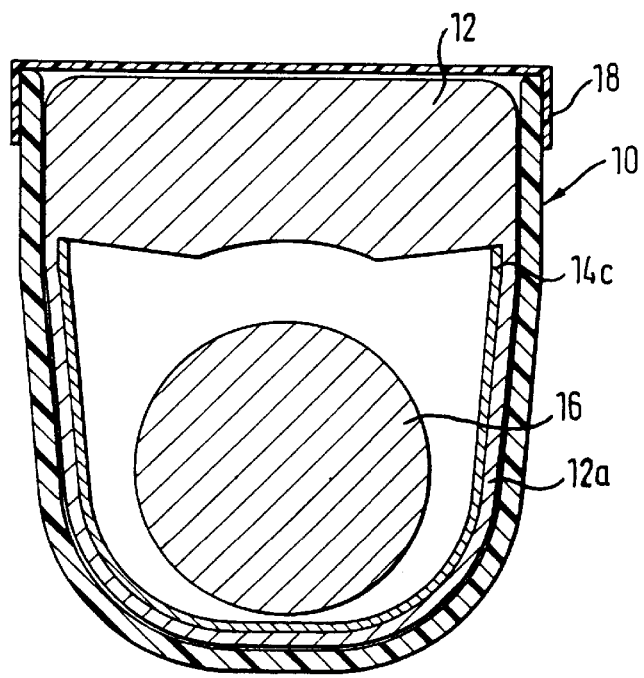
FIG. 4 is a schematic cross-sectional view of the gas bag module.

The gas bag module consists of a generally trough-shaped housing 10, a folded gas bag 12, an insert 14, a tubular inflator 16 and a cover 18 mounted on the top rim of the housing 10. The insert 14 is provided with integral rim portions 14a, 14b which are surrounded by the rim of the inflation opening of the gas bag 12. Furthermore, the insert 14 is provided with a guide plate 14c shaped in such a way that after insertion of the insert 14 into the housing 10 this guide plate 14c is located at least approximately parallel to the inner surface area of the housing and maintains a small distance thereto. The housing 10 is equipped on the inner side with supporting faces 10a, 10b for the rim portions 14a, 14b of the insert 14. A strip-shaped fastener tab 12a mounted on the gas bag 12 surrounds the guide plate 14c and is located, in the installed condition, between the latter and the inner side of the housing 10.

The housing 10 is provided on its opposing end faces with openings 20 for the inflator 16. Corresponding openings 22 are arranged in the end faces of the insert 14. The inflator 16 inserted through the openings 20 and 22 protrudes at both ends from the housing 10.

The housing 10 is provided at its end faces with two integral mounting flanges 24a, 24b. A screw 26 penetrates one of the end faces of the inflator 16, this screw locking the inflator 16 axially to the housing 10. The mounting flanges 24a, 24b may be alternatively or additionally provided on the longitudinal sides of the housing 10.

After the insert 14, together with the gas bag 12 folded thereon, has been inserted into the housing 10 the inflator 16 is inserted through the openings 20, 22. By means of bolts 28 reaching through corresponding openings in the supporting faces 10a, 10b of the housing 10 and by means of corresponding nuts 28a, the insert 14 is then clamped in place against the housing 10. In this action, the rims of the openings 20, 22 engage the outer circumference of the inflator 16 so that it is clamped in place. After having clamped the insert 14 against the housing 10, the inflator 16 is thus secured relative to the housing 10 without the need of further fastener means. By the friction involved, the clamping of the inflator 16 is effective also in the axial direction thereof.

The space in the interior of the housing 10 between the supporting faces 10a, 10b and the surrounding rim of the housing 10 facing away therefrom is taken up by the folded gas bag 12. The folded gas bag 12 is protected by the cover 18 mounted on the surrounding rim of the housing 10 and is maintained in the folded condition. If the folded gas bag protrudes beyond the rim of the housing, a correspondingly extra-high variant of the cover 18 is to be used.

The preferred material for the housing 10 is glass-fiber reinforced polyamide, however, also die-cast aluminum or a sheet-steel design is possible. By contrast, the insert 14 with the integral guide plate 14c is made of metal since it is exposed to high thermal stresses, whereas the cover 18 may be made of a plastics material, preferably polyethylene.

On activation of the inflator 16 the gas bag 12 is deployed and inflated. Due to the expansion pressure of the gas bag a high tensile stress is exerted on the fastener tab 12*a* and via same on the guide plate 14*a*. These stresses are transmitted by the insert 14 to the housing of the inflator 16 and are finally taken up by the openings 20 of the housing 10, it thus being evident that the housing of the inflator 16 acts as a tie rod.

What is claimed is:

1. A gas bag module for a vehicle occupant restraint system, comprising a generally trough-shaped housing, a folded gas bag and an insert for insertion into said housing, said housing having a first face wall portion with a first opening, and a tubular inflator having a main body and being inserted into the housing through said first opening in said first face wall of said housing, wherein:

said housing having opposed first and second end wall portions and respective first and second supporting faces for said insert extending from and substantially perpendicular to the end wall portions;

said insert comprises outwardly extending integral rim portions operatively engaging an inflation opening in said gas bag;

said insert is provided with an integral guide plate extending substantially the length between said supporting faces and substantially parallel and slightly spaced from inner surface areas of said housing;

said insert comprises, opposite the first opening in said first face wall of said housing, a corresponding first opening in a first wall portion of said insert for passage of said inflator;

said main body of said inflator protrudes outwardly from said first opening in said first face wall of said housing; and said insert is fastened to said rim portions against said supporting faces of said housing.

2. The gas bag module as set forth in claim 1, wherein said inflator is clamped in place between a rim defining said first opening in said first face wall of said housing and a rim defining said corresponding first opening of said insert.

3. The gas bag module as set forth in claim 2, wherein said housing has a second face wall opposed to said first face wall and said insert has a second wall part opposed to said first wall part, said second face wall and said second wall part having second openings, respectively, aligned with said first openings for passage of said inflator, said inflator projecting from said housing at both of its axial ends and being clamped between opening defining rims of said housing face walls and said insert at both axial ends of said housing.

4. The gas bag module as set forth in claim 1, wherein said gas bag comprises a mounted fastener tab surrounding said guide plate of said insert.

5. The gas bag module as set forth in claim 1, wherein said housing has a surrounding rim extending away from said supporting faces, said folded gas bag being completely accommodated in a space of said housing defined between said supporting faces and said surrounding rim of said housing.

6. The gas bag module as set forth in claim 1, wherein said tubular inflator is locked against rotation about its axis by positive means provided on said housing.

* * * * *